US008606677B2

(12) United States Patent
Heppenstall, Jr.

(10) Patent No.: US 8,606,677 B2
(45) Date of Patent: *Dec. 10, 2013

(54) DIFFERENTIAL COMMISSION AND ELECTRONIC ORDER MATCHING PROCESS FOR THE DISTRIBUTION OF PRIMARY MARKET FIXED INCOME SECURITIES

(75) Inventor: C. Talbot Heppenstall, Jr., Pittsburgh, PA (US)

(73) Assignee: PriMuni LLC, Pittsburgh, PA (US)

( * ) Notice: Subject to any disclaimer, the term of this patent is extended or adjusted under 35 U.S.C. 154(b) by 1329 days.

This patent is subject to a terminal disclaimer.

(21) Appl. No.: 11/526,841

(22) Filed: Sep. 25, 2006

(65) Prior Publication Data

US 2007/0083453 A1    Apr. 12, 2007

Related U.S. Application Data

(63) Continuation of application No. 10/415,304, filed as application No. PCT/US01/45638 on Nov. 2, 2001, now Pat. No. 7,165,048.

(60) Provisional application No. 60/245,512, filed on Nov. 3, 2000.

(51) Int. Cl.
*G06Q 40/00* (2012.01)

(52) U.S. Cl.
USPC ......................................... 705/36 R; 705/35

(58) Field of Classification Search
USPC ............................................ 705/35, 36 R, 37
See application file for complete search history.

(56) References Cited

U.S. PATENT DOCUMENTS

| | | | |
|---|---|---|---|
| 5,077,665 A | 12/1991 | Silverman et al. | |
| 5,809,483 A | 9/1998 | Broka et al. | |
| 5,915,209 A | 6/1999 | Lawrence | |
| 5,970,479 A * | 10/1999 | Shepherd | 705/37 |
| 6,131,087 A | 10/2000 | Luke et al. | |
| 6,161,099 A * | 12/2000 | Harrington et al. | 705/36 R |
| 6,876,309 B1 * | 4/2005 | Lawrence | 705/37 |
| 2002/0026399 A1 | 2/2002 | Narayan et al. | |
| 2002/0052816 A1 * | 5/2002 | Clenaghan et al. | 705/36 |
| 2009/0037347 A1 * | 2/2009 | Grigsby | 705/36 T |

OTHER PUBLICATIONS

EuroWeek, special Report: E-Bonds, "Learning the Lessons of the Internet," Mar. 2, 2001.
Reserve Bank of Australia Bulletin, "Electronic Trading in Australian Financial Markets," p. 9, Dec. 2001.

* cited by examiner

*Primary Examiner* — Rajesh Khattar
(74) *Attorney, Agent, or Firm* — The Webb Law Firm (57) ABSTRACT

An apparatus and process (collectively the "system") for conducting and managing the primary offering of fixed income securities, specifically, but not exclusively, fixed rate municipal bonds at different prices for like maturities over electronic networks, particularly, but not exclusively, the Internet, is disclosed. A differential commission method for the distribution of primary market fixed income securities, including the steps of: (a) purchasing from an issuer, by an underwriter, at least one fixed income security on the primary market; (b) offering the at least one fixed income security to at least one investor; (c) setting, by a first offerer, a price, including a commission, for the at least one fixed income security; (d) setting, by a subsequent offerer, a different price, including a different commission, for the at least one fixed income security; and (e) purchasing, by the at least one investor, the at least one fixed income security. The system includes the steps of: (1) building and maintaining an inquiry database; (2) building and maintaining a syndicate inputs database; (3) comparing the inquiry database with the syndicate inputs database; and (4) identifying matches between the data in the inquiry database and the syndicate inputs database.

6 Claims, 5 Drawing Sheets

NOTICE: Your client with Inquiry Number 2222 may be  interested in purchasing $100,000 of the new municipal issue below.

If you would like to submit this order to the Retail Syndicate Desk, please click the box below:

Submit Order

If you would like further information on this or other issues please call or email the Retail Syndicate Desk Phone: (412) 555-1212
Email: Retaildesk@PriMuni.com

NEW ISSUE:

| ALL STATE SCHOOL DISTRICT | |
|---|---|
| Coupon: | 5.00% |
| Maturity: | 1-Apr-08 |
| Price: | $ 100.00 |
| Sales Credit: | $ 12.50 |
| First Coupon: | 1-Oct-02 |
| Settlement: | 1-Mar-02 |

FIGURE 6

DIFFERENTIAL COMMISSION AND ELECTRONIC ORDER MATCHING PROCESS FOR THE DISTRIBUTION OF PRIMARY MARKET FIXED INCOME SECURITIES

BACKGROUND OF THE INVENTION

1. Field of Invention

The present invention relates to a method of matching buyers, particular buyers of smaller amounts, and sellers of fixed income securities at different prices and commissions for like maturities, specifically, but not exclusively, municipal bonds, over electronic networks, specifically, but not exclusively, the Internet.

2. Description of the Prior Art

Primary Market

Figure 1:
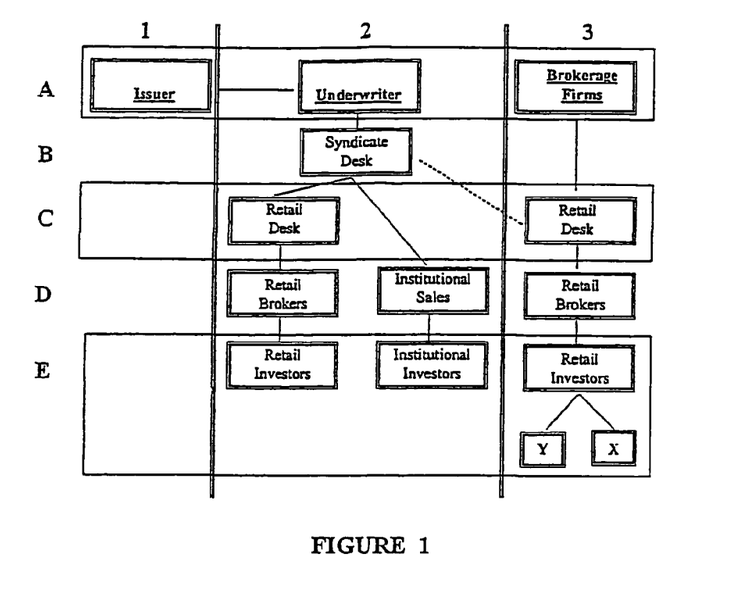
FIG. 1 is a block diagram of a prior art system for the retail distribution and purchase of fixed income securities.

An example of the prior art process is shown in FIG. 1 and the tables below. In FIG. 1, issuers (A) offer bonds for sale to a broker dealer acting as an underwriter (A2) either through a competitive or negotiated process. This prior art process requires that personnel at the syndicate desk (B2) of the underwriter (A2) communicate (either telephonically or by facsimile) the pricing to personnel at retail trading desks (C2, C3) at both the underwriter and at other brokerage firm(s) (Row C) in the selling group. This pricing information typically includes the coupon, maturity, price, yield and commission for each separate security of the fixed income debt instrument issued. A sample of typical pricing information follows as Table 1:

TABLE 1

Pricing Sheet

| Maturity January 1 | Principal | Coupon | Yield | Price | Sales Commission |
|---|---|---|---|---|---|
| 2002 | 100,000 | 5.10% | 5.15% | 0.99952 | 0.250 |
| 2003 | 200,000 | 5.20% | 5.20% | 1.00000 | 0.250 |
| 2004 | 300,000 | 5.30% | 5.35% | 0.99863 | 0.375 |
| 2005 | 400,000 | 5.40% | 5.45% | 0.99822 | 0.375 |
| 2006 | 500,000 | 5.50% | 5.55% | 0.99784 | 0.375 |
| 2007 | 600,000 | 5.65% | 5.60% | 1.00251 | 0.625 |
| 2008 | 700,000 | 5.75% | 5.70% | 1.00285 | 0.625 |
| 2009 | 800,000 | 5.85% | 5.85% | 1.00000 | 0.625 |
| 2010 | 900,000 | 5.95% | 6.00% | 0.99656 | 0.500 |

Fixed income debt instruments are often structured with multiple maturing securities, with each individual security having a common coupon and maturity date and identified by a separate CUSIP (Committee on Uniform Securities Identification Procedures) number. The pricing information includes the amount of the primary market sales commission for each individual security. Current market practice suggests that each originally issued security offered in the primary market be sold at the same price regardless of the size of the order. The individual securities identified by a like CUSIP are also often sold to different types of buyers in both larger institutional and smaller retail denominations. Retail trading desks usually use sales assistants to contact the retail brokers (Row D of FIG. 1) who then solicit retail investors (Row E) for orders. This prior art system is extremely labor-intensive, with several steps requiring human interaction that add time and cost to the overall sale process. Since primary market sales commissions are generally not sufficient to compensate retail brokers to complete this process for smaller, retail orders, the fixed income market (specifically, but not exclusively, the municipal bond market) has developed a process using the secondary market that completes those sales. As a result of this process, most retail investors purchase fixed income securities through brokers, however, more often in the secondary market than in the primary market.

Secondary Market

The inefficiency of the prior art process is demonstrated by the example that over 34% of all municipal bonds outstanding are held by retail investors (Federal Reserve Board, Flow of Funds Accounts, Flows and Outstandings, First Quarter, 2000) while research indicates that only 12.5% of the bonds are initially sold to retail investors at the initial re-offering prices (primary market). The remaining 21.5% of municipal bonds reach the retail investor during the first six months after issuance in the secondary market. A major barrier to effective retail distribution of originally issued fixed income securities, particularly but not exclusively, municipal bonds, has been the inability, given brokerage firm cost structures, for retail brokers to write a ticket for a small purchase of bonds during the initial offering period. The median size purchase of municipal bonds in the market is $25,000, which clearly indicates strong retail trading in the market.

Primary market sales commissions (generally between 0.25% and 0.50% of the par amount) generate between $62 and $125 for $25,000 orders. These commissions are not competitive with other financial products offered by brokerage firms to their retail clients, including secondary market municipal bonds. Under current industry practice, broker-dealers or institutional investors purchase primary market bonds from underwriters and convert higher yields (in the form of original issue discount or coupon payments) into commission dollars in the secondary market by marking up the price of the bonds. After the markups, retail brokers redistribute the bonds to retail investors with higher commissions.

Table 2 shows an example of the existing prior art process using the secondary market.

TABLE 2

Existing Process

| | Order | Price | Yield | Sales Commission | | Proceeds from Sale of Bonds | |
|---|---|---|---|---|---|---|---|
| | Size($) | (%) | (%) | % | Dollars | % | Dollars |
| | | | Primary Market | | | | |
| | A1 | 100,000 | 98.50 | 5.70 | .50 | 500 | 98.00 | 98,000 |
| | B1 | 20,000 | 98.50 | 5.70 | .50 | 100 | 98.00 | 19,600 |
| | | | Secondary Market | | | | |
| | B2 | 20,000 | 99.00 | 5.65 | 1.00 | 200 | | |
| X | B3 | 10,000 | 100.00 | 5.55 | 1.00 | 100 | | |
| Y | B4 | 10,000 | 100.50 | 5.50 | 1.50 | 150 | | |

This example assumes that the retail investors shown in line X and Y each want $10,000 of municipal bonds. The issuer sells $120,000 of bonds that are initially offered for sale to the public by the underwriter at a price of 98.50%, which reflects an "original issue discount" of 1.50%. In addition, the underwriter charges the issuer a sales commission (or underwriting fee) of 0.50%. The issuer's total cost is 5.75%. The prior art process includes the same sales commission for an order that would be obtained from a typical institutional investor (shown on line A1 of Table 2) or from a typical retail investor (shown on line B1 of Table 2).

Figure 2:
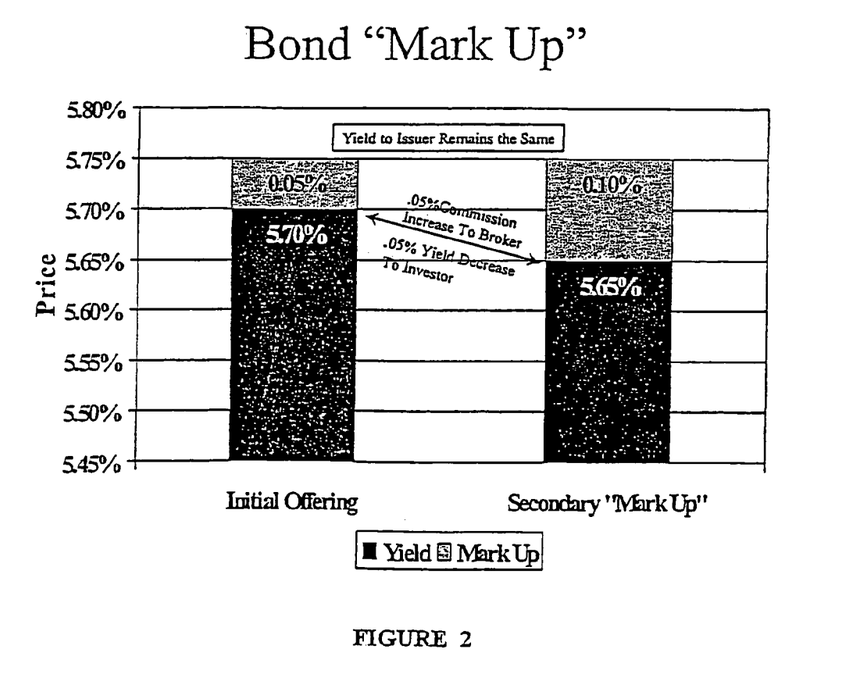
FIG. 2 is a chart of a typical secondary market bond "mark up" in the prior art system for the retail distribution and purchase of fixed income securities.

Under the prior art process, retail brokers are unlikely to submit the $10,000 orders in the primary market because the sales commissions are lower than commissions paid on other investments. In this example, the underwriting firm received no retail orders for the bonds on Line B1 of Table 2 and decided to sell the bonds to another brokerage firm in the secondary market, as shown on Line B2 of Table 2. The underwriter increased the price of the bonds (see FIG. 2) $100 to increase the commission and thereby lowered the yield to 5.65%. This resulted in commissions of $200 to the underwriter, or twice as much as the firm would have made by selling the bonds in the primary market to retail investors. The brokerage firm then resells $10,000 of the bonds to a retail investor (X) at a yield of 5.55% and earns an additional $100 in sales commissions, as shown on Line B3 of Table 2. The same brokerage firm resells the other $10,000 to another retail investor (Y) at a yield of 5.50% and earns an additional $150, as shown on Line B4 of Table 2. The total cost of distributing this $20,000 in bonds to retail investors was $450 or 2.25% of the amount of the bonds sold. The issuer paid all of these costs, which included $100 as disclosed initially in an underwriting fee and $350 in the form of the higher yield of 5.70%.

Secondary market markups are a cost not just to the retail investor, but also to the issuer of the municipal bonds. The existence of this inefficient distribution system creates more profit (and risk) for financial intermediaries at the expense of both issuers and investors. Known patents in the field include U.S. Pat. Nos. 5,809,483; 5,915,209; 6,161,099 and 6,236,972.

SUMMARY OF THE INVENTION

It is, therefore, a drawback that the prior art process has focused on institutional distribution of fixed income securities in the primary market. It is another drawback of the prior art that all fixed income securities are sold at the same price, regardless of quantity purchased. People skilled in the art believe that regulatory agencies prohibit the sales of smaller lot sizes of bonds at higher prices during the initial offering period. It is a further drawback of the prior art that information regarding primary market fixed income securities issues is not provided to Retail Investors in time for them to participate in the primary market distribution process.

In order to overcome these drawbacks, the present invention is directed to a differential commission and electronic order matching process for the distribution of primary fixed income securities. Further, the present invention is an apparatus and process (collectively the "system") for conducting and managing sales in the primary market of fixed income securities, specifically, but not exclusively, fixed rate municipal bonds, at different prices for like maturities over electronic networks, particularly, but not exclusively, the Internet.

The system of the present invention includes a differential commission method for the distribution of primary market fixed income securities, including the steps of: (a) purchasing from an issuer, by an underwriter, at least one fixed income security in the primary market; (b) offering the at least one fixed income security to at least one investor; (c) setting, by a first offerer, a price, including a commission, for the at least one fixed income security; (d) setting, by a subsequent offerer, a different price including a different commission, for the at least one fixed income security; and (e) purchasing, by the at least one investor, the at least one fixed income security.

The system of the present invention also includes a computer-implemented communication and order matching method for fixed income securities, including the steps of: (1) building and maintaining an inquiry database; (2) building and maintaining a syndicate inputs database; (3) comparing the inquiry database with the syndicate inputs database; and (4) identifying matches between the data in the inquiry database and the syndicate inputs database.

The present invention, both as to its construction and method of operation, together with additional objects and advantages thereof, will best be understood from the following description of specific embodiments when read in connection with the accompanying drawings.

DETAILED DESCRIPTION OF THE PREFERRED EMBODIMENTS

The present invention is a Differential Commission Method (the "process") that will allow issuers to directly access retail investors by electronically incorporating current secondary market pricing practices during a primary offering. Further, the present invention is a system for conducting and managing sales in the offering of fixed income securities, specifically, but not exclusively, fixed rate municipal bonds, at different prices for like maturities over electronic networks, particularly, but not exclusively, the Internet (the "system"). The process and system are advantageous over prior art arrangements in that they: (1) increase the amount of primary market retail distribution and, hence, market efficiency; (2) increase yields earned by retail investors; (3) lower the borrowing costs of municipal bond issuers; (4) improve price transparency in the municipal bond market; (5) increase revenues for underwriters by increasing retail volume; (6) assist firms to monitor retail suitability for municipal bonds; (7) improve customer relations between retail brokers and investors; and (8) reduce inventory/holding risk for broker dealers.

The process consists of the Differential Primary Commission Structure, which may be utilized with the Electronic Communications and Order Matching System. Issuers, investors, brokerage firms and underwriters will be able to implement the Differential Primary Commission Structure across a virtual network of broker-dealers that can be formed and disbanded using the system for each particular issue.

Differential Primary Commission Structure

The Differential Primary Commission Structure (DPCS) will provide investors with higher yields, borrowers with lower costs and retail brokers with the ability to charge fair commissions for smaller primary market orders. Retail brokers will sell primary market bonds to investors for any fair combination of yield and commission, with maximum commissions determined by each brokerage firm or the issuer.

Figure 3:
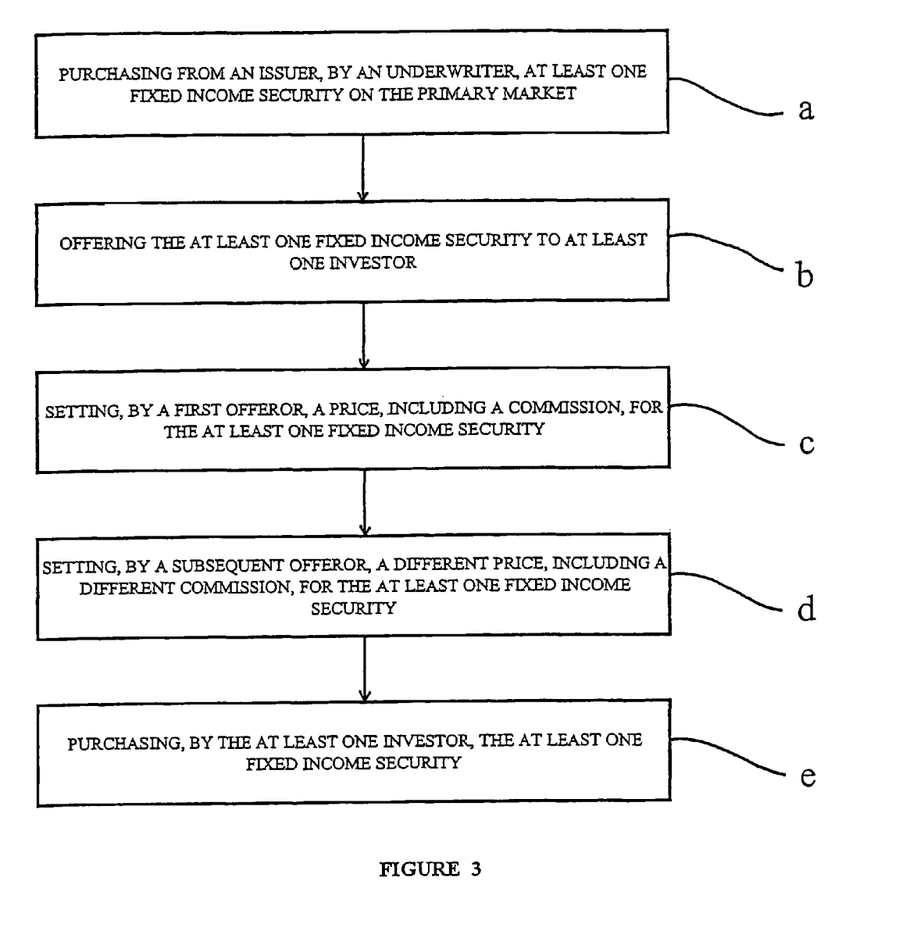
FIG. 3 is a flow diagram of a differential commission method for the distribution of primary market fixed income securities according to the present invention.

This DPCS is a differential commission method for the distribution of primary market fixed income securities. As illustrated in FIG. 3, the DPCS preferably includes the steps of: (a) purchasing from an issuer, by an underwriter, at least one fixed income security on the primary market; (b) offering the at least one fixed income security to at least one investor;

(c) setting, by a first offerer, a price, including a commission, for the at least one fixed income security; (d) setting, by a subsequent offerer, a different price, including a different commission, for the at least one fixed income security; and (e) purchasing, by the at least one investor, the at least one fixed income security. It is this ability of a first or subsequent offerer to set a different commission for the fixed income security in the primary market that recognizes particular benefits. The fixed income security may be a municipal bond, a corporate bond, a government agency security, etc.

Tables 3 and 4 below outline the changes to the prior art that the present invention will permit.

TABLE 3

DPCS Process

| Order Size | Price (%) | Yield | Sales Commission | | Proceeds from Sale of Bonds | |
|---|---|---|---|---|---|---|
| | | | % | Dollars | % | Dollars |
| Primary Market | | | | | | |
| A1 100,000 | 98.500 | 5.70 | .50 | 500 | 98.000 | 98,000 |
| B3 10,000 | 99.500 | 5.60 | 1.00 | 100 | 98.50 | 9,850 |
| B4 10,000 | 100.00 | 5.55 | 1.50 | 150 | 98.50 | 9,850 |

In Table 3, the same orders described in B3 and B4 of Table 2 occur in the primary market instead of the secondary market. The DPCS, by removing the initial markup charged by the underwriting firm to other brokerage firms in Line B2 of Table 2, allows retail investors to purchase the bonds with yields that are 5 basis points higher than Table 2. The DPCS provides the retail brokers with the same sales commission ($250). By increasing the issuer's proceeds (from $117,600 to $117,700) the structure will lower the issuer's costs by 5 basis points.

TABLE 4

Comparison

| | Existing | DPCS |
|---|---|---|
| Yields Earned by Investor X | 5.55 | 5.60 |
| Yields Earned by Investor Y | 5.50 | 5.55 |
| Sales Commissioned by Retail Brokers | $ 250 | $ 250 |
| Issuer's Sales Proceeds from Bonds | 117,600 | 117,700 |
| Issuer's Total Cost | 5.75 | 5.70 |

The DPCS will improve the ability of broker-dealers to sell originally issued bonds directly to retail investors. The present invention will make the fixed income market, particularly but not exclusively, the municipal bond market, more efficient and provide issuers with lower interest costs through wider distribution.

The present invention also provides a solution to regulatory concerns over appropriate markups, price transparency and investor suitability for municipal bonds. For example, a primary goal of the Municipal Securities Rulemaking Board (MSRB) and the Securities and Exchange Commission (SEC) is to increase price transparency in the municipal bond market. By moving retail distribution from the secondary market to the primary market, the process will improve price transparency. The total sales commission would be disclosed to the retail customer on the confirmation. The retail commissions that would be charged through the process would be smaller than secondary markups because the broker-dealer's inventory risk is eliminated.

The first or subsequent offerer's commission may be set within a predetermined range, e.g., from around 0% to around 4% of the principal amount of the fixed income security. The offerer is typically a broker, a retail salesperson or an institutional salesperson, and the investor is typically either a retail investor or an institutional investor. The issuer may determine a portion of the fixed income security price, which would result in an issuer cost savings.

The present invention is also directed to an apparatus for implementing a differential commission method for the distribution of primary market fixed income securities, including: means for purchasing from an issuer, by an underwriter, at least one fixed income security on the primary market; means for offering the at least one fixed income security to at least one investor; means for setting, by a first offerer, a price including a commission, for the at least one fixed income security; means for setting, by a subsequent offerer, a different price, including a different commission, for the at least one fixed income security; and means for purchasing, by the at least one investor, the at least one fixed income security.

Electronic Communication and Order Matching System

The Electronic Communication and Order Matching System of the present invention will provide groups of broker-dealers and issuers with an apparatus and computer-implemented system to implement the Differential Primary Commission Structure (or process) for the sale of new fixed income securities. In a preferred embodiment, the system will search multiple databases and find multiple matches between demand represented by inquiries (the "inquiries") and supply represented by underwriting syndicates (the "syndicate inputs"). The system may generate Electronic Order Solicitations to the users in the initial embodiment or may execute an order in another embodiment. In a preferred embodiment, the system performs step 1 through step 4 shown in FIG. 4; in particular: (1) building and maintaining an inquiry database; (2) building and maintaining a syndicate inputs database; (3) comparing the inquiry database with the syndicate inputs database; and (4) identifying matches between the data in the inquiry database and the syndicate inputs database. This method is equally effective in both the primary market, as well as the secondary market.

In step 1, the system builds and maintains an inquiry database. For example, the inquiry database may contain retail inquiry data, which are completed for retail customers by retail brokers for each potential purchase of bonds. The offerer or broker may input the necessary data into the inquiry database. In addition, the inquiry database may be comprised of multiple discrete databases, and these databases may be linked. These databases may be updated by a user, a broker, a customer, a retail salesperson, an institutional salesperson, and the like.

As described in the process above, the inquiry database may include fields containing information directed to a desired commission, a minimum commission, a maximum commission and/or a commission range acceptable to a first offerer. Similarly, the inquiry database may include fields directed to a desired commission, a minimum commission, a maximum commission and a commission range acceptable to a subsequent offerer. The term "offerer" includes brokers, retail salespersons, institutional salespersons, and the like.

The system will maintain the inquiry database that contains the inquiries entered by the offerers or brokers. Data regarding an individual inquiry in the inquiry database may only be maintained for a set period. After the set period expires, a notice is transmitted to the originator of the individual inquiry data. The originator may be a user, a broker, a customer, a retail salesperson, an institutional salesperson, and the like.

For example, in a preferred embodiment, inquiries will only be maintained for two weeks. After two weeks, the system may send a notice to the broker to confirm that the inquiry is still current. The information contained in each inquiry will enable the system to solicit orders for bonds that are suitable to each particular investor. As shown in Table 5, one example of an inquiry, in this case a retail inquiry, is as follows:

TABLE 5

Retail Inquiry

| Field Number | Fields for Retail Broker | Field Type | Character Length |
|---|---|---|---|
| R1 | State of Issuer | Alphanumeric | 2 |
| R2 | Minimum Maturity Date | Date | 10 |
| R3 | Maximum Maturity Date | Date | 10 |
| R4 | Federal Tax-Exempt | Alphanumeric | 1 |
| R5 | State Tax-Exempt | Alphanumeric | 1 |
| R6 | Bank-Qualified | Alphanumeric | 1 |
| R7 | Alternative Minimum Tax | Alphanumeric | 1 |
| R8 | AAA Insured | Alphanumeric | 15 |
| R9 | Minimum Underlying Rating | Alphanumeric | 7 |
| R10 | Maximum Price | Percent | 8 |
| R11 | Minimum Commission | Percent | 8 |
| R12 | Minimum Coupon | Percent | 8 |
| R13 | Minimum Yield | Percent | 8 |
| R14 | Brokerage Firm | Alphanumeric | 50 |
| R15 | Broker Name | Alphanumeric | 50 |
| R16 | Investor Name | Alphanumeric | 50 |
| R17 | Investor Account Number | Alphanumeric | 20 |

Other inquiries could be used that would expand upon this information.

The system will use the information concerning the brokerage firm (R14), the broker (R15) and the investor (R16 and R17) only to notify the broker of a match. The system will match individual retail investors only upon approval from each brokerage firm in the selling group. This ensures that the retail investors and the broker are unknown to the syndicate manager until after an order has been placed.

The information in fields R1-R13 above is descriptive of the specific demand of the retail investor. Since municipal bonds have different tax treatment based on the state of issue and the residence of the investor, most retail investors have a preference for bonds issued in their own state. Field R1 provides the preferred state or states of the investor.

Fields R2 and R3 describe the maturity range that the investor prefers. Retail brokers will be able to specify either a range of dates or one specific date.

Fields R4 through R7 describe the retail investor's tax preferences. Field R8 checks whether this investor, as many retail investors do, has a preference for insured bonds. If the investor is willing to consider uninsured bonds, Field R9 describes the minimum rating acceptable to the investor.

Fields R10 through R13 describe the acceptable pricing parameters, including Maximum Price (R10), Minimum Commission (R11), Minimum Coupon (R12) and Minimum Yield (R13).

The fields will be cross-checked by the system against corresponding syndicate input fields using the method illustrated in FIG. 4 and described in "Primary Market Distribution Function" below. The inquiries will be updated by the brokers or the sales assistants as needed. As discussed above, the system returns each inquiry to the user after two weeks.

Figure 4:
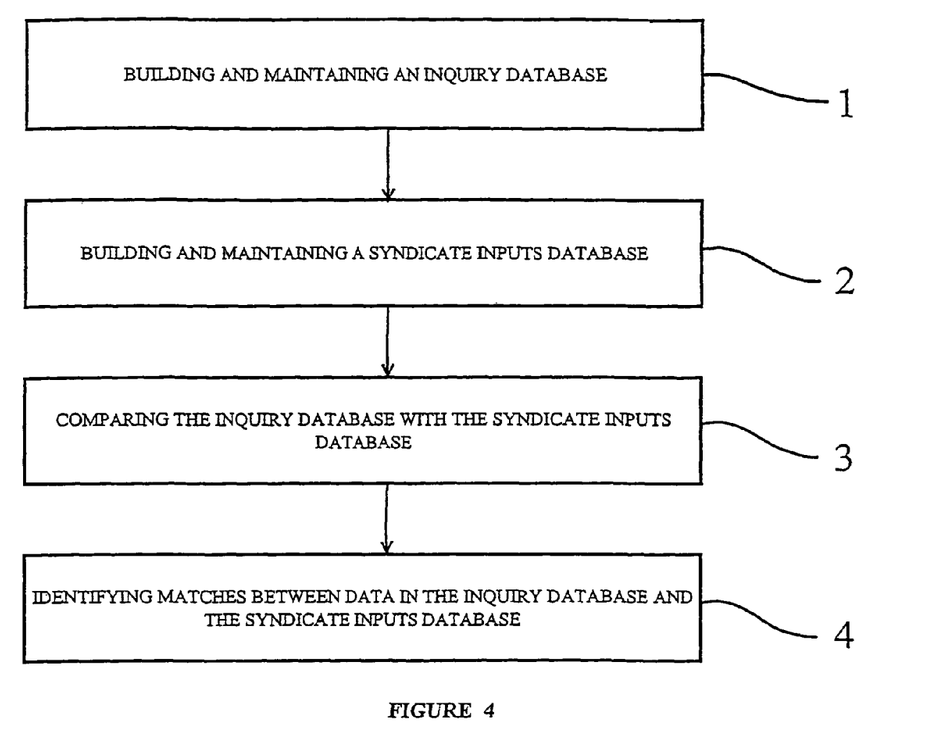
FIG. 4 is a flow diagram of a computer-implemented communication and order matching method for fixed income securities according to the present invention.

In the next step, step 2 of FIG. 4, the system builds and maintains a syndicate inputs database. Typically, a syndicate representative enters the data to build the syndicate inputs database. As with the inquiry database, the syndicate inputs database may be comprised of multiple discrete databases, which may be linked. The syndicate representative may view a summary of the data in the inquiry database. Generally these syndicate pricing inputs may be open for the retail and institutional or both order period. In a preferred embodiment, the syndicate inputs database contains information as follows in Table 6:

TABLE 6

Syndicate Inputs

| Field Number | Fields for Syndicate Manager | Field Type | Character Length |
|---|---|---|---|
| S1 | Name of Issuer | Alphanumeric | 150 |
| S2 | Title of Issue/Series | Alphanumeric | 150 |
| S3 | State of Issuer | Alphanumeric | 2 |
| S4 | Lead Underwriter | Alphanumeric | 20 |
| S5 | Award Date | Date | 10 |
| S6 | Dated Date | Date | 10 |
| S7 | Settlement Date | Date | 10 |
| S8 | First Interest Payment Date | Date | 10 |
| S9 | Federal Tax-Exempt | Alphanumeric | 1 |
| S10 | State Tax-Exempt | Alphanumeric | 1 |
| S11 | Bank-Qualified | Alphanumeric | 1 |
| S12 | Alternative Minimum Tax | Alphanumeric | 1 |
| S13 | Call Date First | Date | 10 |
| S14 | Call Price First | Percent | 8 |
| S15 | Call Date Par | Date | 10 |
| S16 | AAA Insurance | Alphanumeric | 15 |
| S17 | Letter of Credit Bank | Alphanumeric | 15 |
| S18 | Letter of Credit Expiration | Date | 10 |
| S19 | Liquidity Provider | Alphanumeric | 15 |
| S20 | Liquidity Expiration | Date | 10 |
| S21 | Moody's Rating | Alphanumeric | 7 |
| S22 | S&P Rating | Alphanumeric | 7 |
| S23 | Fitch Rating | Alphanumeric | 7 |
| S24 | Date - Serial 01 | Date | 10 |
| S25 | Date - Serial 02 | Date | 10 |
| S26 | Date - Serial 03 | Date | 10 |
| S27 | Date - Serial 04 | Date | 10 |
| S28 | Date - Serial 05 | Date | 10 |
| S29 | Date - Serial 06 | Date | 10 |
| S30 | Date - Serial 07 | Date | 10 |
| S31 | Date - Serial 08 | Date | 10 |
| S32 | Date - Serial 09 | Date | 10 |
| S33 | Date - Serial 10 | Date | 10 |
| S34 | Date - Serial 11 | Date | 10 |
| S35 | Date - Serial 12 | Date | 10 |
| S36 | Date - Serial 13 | Date | 10 |
| S37 | Date - Serial 14 | Date | 10 |
| S38 | Date - Serial 15 | Date | 10 |
| S39 | Date - Serial 16 | Date | 10 |
| S40 | Date - Serial 17 | Date | 10 |
| S41 | Date - Serial 18 | Date | 10 |
| S42 | Date - Serial 19 | Date | 10 |
| S46 | Date - Term 03 | Date | 10 |
| S47 | Date - Term 04 | Date | 10 |
| S48 | Date - Term 05 | Date | 10 |
| S49 | Date - Term 06 | Date | 10 |
| S50 | Date - Term 07 | Date | 10 |
| S51 | Date - Term 08 | Date | 10 |
| S52 | Date - Term 09 | Date | 10 |
| S53 | Date - Term 10 | Date | 10 |
| S54 | Initial Reoffering Price - Serial 01 | Percent | 8 |
| S55 | Initial Reoffering Price - Serial 02 | Percent | 8 |
| S56 | Initial Reoffering Price - Serial 03 | Percent | 8 |
| S57 | Initial Reoffering Price - Serial 04 | Percent | 8 |
| S58 | Initial Reoffering Price - Serial 05 | Percent | 8 |
| S59 | Initial Reoffering Price - Serial 06 | Percent | 8 |
| S60 | Initial Reoffering Price - Serial 07 | Percent | 8 |
| S61 | Initial Reoffering Price - Serial 08 | Percent | 8 |
| S62 | Initial Reoffering Price - Serial 09 | Percent | 8 |
| S63 | Initial Reoffering Price - Serial 10 | Percent | 8 |
| S64 | Initial Reoffering Price - Serial 11 | Percent | 8 |
| S65 | Initial Reoffering Price - Serial 12 | Percent | 8 |
| S66 | Initial Reoffering Price - Serial 13 | Percent | 8 |
| S67 | Initial Reoffering Price - Serial 14 | Percent | 8 |

TABLE 6-continued

Syndicate Inputs

| Field Number | Fields for Syndicate Manager | Field Type | Character Length |
|---|---|---|---|
| S68 | Initial Reoffering Price - Serial 15 | Percent | 8 |
| S69 | Initial Reoffering Price - Serial 16 | Percent | 8 |
| S70 | Initial Reoffering Price - Serial 17 | Percent | 8 |
| S71 | Initial Reoffering Price - Serial 18 | Percent | 8 |
| S72 | Initial Reoffering Price - Serial 19 | Percent | 8 |
| S73 | Initial Reoffering Price - Serial 20 | Percent | 8 |
| S74 | Initial Reoffering Price - Term 01 | Percent | 8 |
| S75 | Initial Reoffering Price - Term 02 | Percent | 8 |
| S76 | Initial Reoffering Price - Term 03 | Percent | 8 |
| S77 | Initial Reoffering Price - Term 04 | Percent | 8 |
| S78 | Initial Reoffering Price - Term 05 | Percent | 8 |
| S79 | Initial Reoffering Price - Term 06 | Percent | 8 |
| S80 | Initial Reoffering Price - Term 07 | Percent | 8 |
| S81 | Initial Reoffering Price - Term 08 | Percent | 8 |
| S82 | Initial Reoffering Price - Term 09 | Percent | 8 |
| S83 | Initial Reoffering Price - Term 10 | Percent | 8 |
| S84 | Coupon - Serial 01 | Percent | 8 |
| S85 | Coupon - Serial 02 | Percent | 8 |
| S86 | Coupon - Serial 03 | Percent | 8 |
| S87 | Coupon - Serial 04 | Percent | 8 |
| S88 | Coupon - Serial 05 | Percent | 8 |
| S89 | Coupon - Serial 06 | Percent | 8 |
| S90 | Coupon - Serial 07 | Percent | 8 |
| S91 | Coupon - Serial 08 | Percent | 8 |
| S92 | Coupon - Serial 09 | Percent | 8 |
| S93 | Coupon - Serial 10 | Percent | 8 |
| S94 | Coupon - Serial 11 | Percent | 8 |
| S95 | Coupon - Serial 12 | Percent | 8 |
| S96 | Coupon - Serial 13 | Percent | 8 |
| S97 | Coupon - Serial 14 | Percent | 8 |
| S98 | Coupon - Serial 15 | Percent | 8 |
| S99 | Coupon - Serial 16 | Percent | 8 |
| S100 | Coupon - Serial 17 | Percent | 8 |
| S101 | Coupon - Serial 18 | Percent | 8 |
| S102 | Coupon - Serial 19 | Percent | 8 |
| S103 | Coupon - Serial 20 | Percent | 8 |
| S104 | Coupon - Term 01 | Percent | 8 |
| S105 | Coupon - Term 02 | Percent | 8 |
| S106 | Coupon - Term 03 | Percent | 8 |
| S107 | Coupon - Term 04 | Percent | 8 |
| S108 | Coupon - Term 05 | Percent | 8 |
| S109 | Coupon - Term 06 | Percent | 8 |
| S110 | Coupon - Term 07 | Percent | 8 |
| S111 | Coupon - Term 08 | Percent | 8 |
| S112 | Coupon - Term 09 | Percent | 8 |
| S113 | Coupon - Term 10 | Percent | 8 |
| S114 | Maximum Sales Commission - Serial 01 | Percent | 8 |
| S115 | Maximum Sales Commission - Serial 02 | Percent | 8 |
| S116 | Maximum Sales Commission - Serial 03 | Percent | 8 |
| S117 | Maximum Sales Commission - Serial 04 | Percent | 8 |
| S118 | Maximum Sales Commission - Serial 05 | Percent | 8 |
| S119 | Maximum Sales Commission - Serial 06 | Percent | 8 |
| S120 | Maximum Sales Commission - Serial 07 | Percent | 8 |
| S121 | Maximum Sales Commission - Serial 08 | Percent | 8 |
| S122 | Maximum Sales Commission - Serial 09 | Percent | 8 |
| S123 | Maximum Sales Commission - Serial 10 | Percent | 8 |
| S124 | Maximum Sales Commission - Serial 11 | Percent | 8 |
| S125 | Maximum Sales Commission - Serial 12 | Percent | 8 |
| S126 | Maximum Sales Commission - Serial 13 | Percent | 8 |
| S127 | Maximum Sales Commission - Serial 14 | Percent | 8 |
| S128 | Maximum Sales Commission - Serial 15 | Percent | 8 |
| S129 | Maximum Sales Commission - Serial 16 | Percent | 8 |
| S130 | Maximum Sales Commission - Serial 17 | Percent | 8 |
| S131 | Maximum Sales Commission - Serial 18 | Percent | 8 |
| S132 | Maximum Sales Commission - Serial 19 | Percent | 8 |
| S133 | Maximum Sales Commission - Serial 20 | Percent | 8 |
| S134 | Maximum Sales Commission - Term 01 | Percent | 8 |
| S135 | Maximum Sales Commission - Term 02 | Percent | 8 |
| S136 | Maximum Sales Commission - Term 03 | Percent | 8 |
| S137 | Maximum Sales Commission - Term 04 | Percent | 8 |
| S138 | Maximum Sales Commission - Term 05 | Percent | 8 |
| S139 | Maximum Sales Commission - Term 06 | Percent | 8 |
| S140 | Maximum Sales Commission - Term 07 | Percent | 8 |
| S141 | Maximum Sales Commission - Term 08 | Percent | 8 |
| S142 | Maximum Sales Commission - Term 09 | Percent | 8 |
| S143 | Maximum Sales Commission - Term 10 | Percent | 8 |
| S144 | Initial Reoffering Yield - Serial 01 | Percent | 8 |
| S145 | Initial Reoffering Yield - Serial 02 | Percent | 8 |
| S146 | Initial Reoffering Yield - Serial 03 | Percent | 8 |
| S147 | Initial Reoffering Yield - Serial 04 | Percent | 8 |
| S148 | Initial Reoffering Yield - Serial 05 | Percent | 8 |
| S149 | Initial Reoffering Yield - Serial 06 | Percent | 8 |
| S150 | Initial Reoffering Yield - Serial 07 | Percent | 8 |
| S151 | Initial Reoffering Yield - Serial 08 | Percent | 8 |
| S152 | Initial Reoffering Yield - Serial 09 | Percent | 8 |
| S153 | Initial Reoffering Yield - Serial 10 | Percent | 8 |
| S154 | Initial Reoffering Yield - Serial 11 | Percent | 8 |
| S155 | Initial Reoffering Yield - Serial 12 | Percent | 8 |
| S156 | Initial Reoffering Yield - Serial 13 | Percent | 8 |
| S157 | Initial Reoffering Yield - Serial 14 | Percent | 8 |
| S158 | Initial Reoffering Yield - Serial 15 | Percent | 8 |
| S159 | Initial Reoffering Yield - Serial 16 | Percent | 8 |
| S160 | Initial Reoffering Yield - Serial 17 | Percent | 8 |
| S161 | Initial Reoffering Yield - Serial 18 | Percent | 8 |
| S162 | Initial Reoffering Yield - Serial 19 | Percent | 8 |
| S163 | Initial Reoffering Yield - Serial 20 | Percent | 8 |
| S164 | Initial Reoffering Yield - Term 01 | Percent | 8 |
| S165 | Initial Reoffering Yield - Term 02 | Percent | 8 |
| S166 | Initial Reoffering Yield - Term 03 | Percent | 8 |
| S167 | Initial Reoffering Yield - Term 04 | Percent | 8 |
| S168 | Initial Reoffering Yield - Term 05 | Percent | 8 |
| S169 | Initial Reoffering Yield - Term 06 | Percent | 8 |
| S170 | Initial Reoffering Yield - Term 07 | Percent | 8 |
| S171 | Initial Reoffering Yield - Term 08 | Percent | 8 |
| S172 | Initial Reoffering Yield - Term 09 | Percent | 8 |
| S173 | Initial Reoffering Yield - Term 10 | Percent | 8 |

This information is entered by the syndicate manager for a municipal bond issue. This is only one example of how the syndicate inputs database might appear. Fields are divided into general information concerning the bond issue (S1-S23) and into the following categories: maturity dates (S24-S53); minimum price (S54-S83); coupon rate (S84-S113); maximum sales commissions (S114-S143); and yield (S144-S173).

After receipt or input of the information derived in steps 1 and 2, the system performs the Primary Market Distribution Function or process (steps 3 and 4 of FIG. 4). This process entails comparing the inquiry database against the syndicate inputs database for each new issue (step 3). Next, the process will identify all matches between the syndicate inputs and the profiles (step 4). In steps 3 and 4, a user of the system enters an inquiry or an order that represents a potential purchase of fixed income securities. This information includes the commission, if any, that the user desires to earn. The system compares this information with information provided by the underwriter (on behalf of the issuer) during the primary offering process of originally issued bonds. If the system identifies a match, it notifies the user. Included in the notification may be the particular price that will allow the user to earn the lower of his desired commission or the maximum commission for that maturity agreed to by the underwriter and the issuer for that particular issue. Importantly, different offerers may input different desired commission amounts within their own set ranges. Using the DPCS of the present invention, the system performs appropriate database querying and matching in steps 3 and 4.

Figure 5:
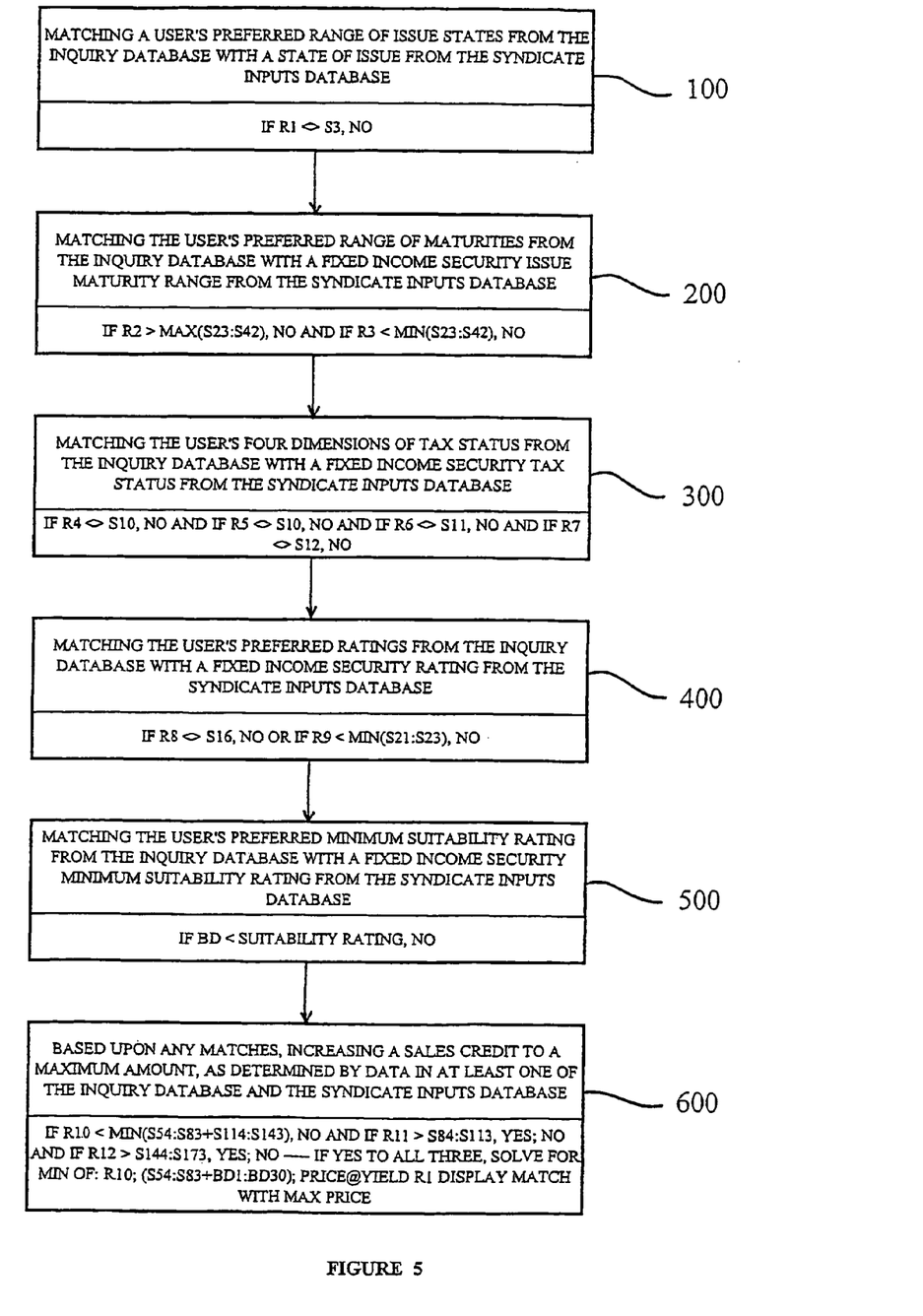
FIG. 5 is a flow diagram of method for managing the sale of municipal bonds in the system of FIG. 4.

FIG. 5 illustrates the method of steps 3 and 4 in FIG. 4 that the system would execute when operating with municipal bonds. In this embodiment, the fixed income security is a municipal bond offered on the primary market. This method includes the steps of: matching a user's preferred range of issue states from the inquiry database with a state of issue from the syndicate inputs database (step 100); matching the user's preferred range of maturities from the inquiry database with a fixed income security issue maturity range from the syndicate inputs database (step 200); matching the user's four dimensions of tax status from the inquiry database with a fixed income security tax status from the syndicate inputs database (step 300); matching the user's preferred ratings from the inquiry database with a fixed income security rating from the syndicate inputs database (step 400); matching the user's preferred minimum suitability rating from the inquiry database with a fixed income security minimum suitability rating from the syndicate inputs database (step 500); and based upon any matches, increasing a sales credit to a maximum amount, as determined by data in at least one of the inquiry and the syndicate inputs database (step 600).

This method will perform the six steps illustrated in FIG. 5 for each open inquiry and syndicate pricing input. The first step (100) checks whether the new issue meets the investor's state preference. In this step, the method determines the range if the retail states desired match the state of issue. If no state is entered, the method proceeds.

The next step (200) checks whether the investor's desired range is within the range of maturities for the new issue. This step checks whether the desired maturity date of retail investor is in the range of issue maturities.

The next step (300) matches the four dimensions of the tax status of the investor's preferences against the new issue. All retail investor requests for tax status must match issue specification. If no detailed preferences, the method proceeds.

The next step (400) checks the investor's rating preferences (including bond insurance) versus the syndicate pricing. First, the method checks for retail investor's desire for AAA insurance. If no match occurs, the method entails requesting a minimum credit rating.

In the next step (500), the method performs the previously described test by investors for minimum suitability. This step ensures the minimum suitability rating of the investor.

In the last step (600), the method performs the pricing parameter matching formula. This step determines if any bonds meet the criteria. If the bond(s) do meet the criteria, the method increases sales credit to the maximum amount, as determined by retail, firm or syndicate parameters. The result of the test will be the combination of price, commission and yield that meet the issuer and investor's parameters at the lowest clearing price and the highest yield. As shown in Table 7, an example of the pricing parameters test is a follows:

TABLE 7

Example of Pricing Parameters Test

| SYNDICATE/FIRM INPUTS | | RETAIL INPUTS | |
|---|---|---|---|
| DATED: | Dec. 1, 2000 | | |
| SETTLE: | Dec. 1, 2000 | | |
| MATURITY: | Dec. 1, 2010 | | |
| COUPON: | 5.000% | MIN COUPON (R12): | 5.000% |
| YIELD: | 5.500% | MIN YIELD (R13) | 5.250% |
| PRICE TO ISSUER: | 96.193% | MAX PRICE (R10) | 100.000% |
| PRICE TO INVESTOR (MIN) | 96.693% | MIN COMMISSION (R11) | |
| PRICE TO INVESTOR (MAX | 99.193% | | |
| SALES CREDIT (MIN) | 0.500% | | |
| SALES CREDIT (MAX) | 3.000% | | |

| TESTS TO SEE IF MATCH IS POSSIBLE: | |
|---|---|
| Is Syndicate Bond Coupon equal or greater than minimum? | YES. |
| Is Syndicate Bond Yield equal or greater than minimum? | YES. |
| Is Syndicate Bond Price to Investor equal or less than maximum? | YES. |

| IF MATCH IS POSSIBLE, MATCH PRICE CAN BE DETERMINED AS THE MINIMUM OF: | |
|---|---|
| SYNDICATE MAX PRICE: | 99.193% |
| MAX PRICE: | 100.000% |
| MATCH PRICE: | 98.074% |
| Additional Markup from Syndicate Price to Issuer: | 1.881% |

Figure 6:
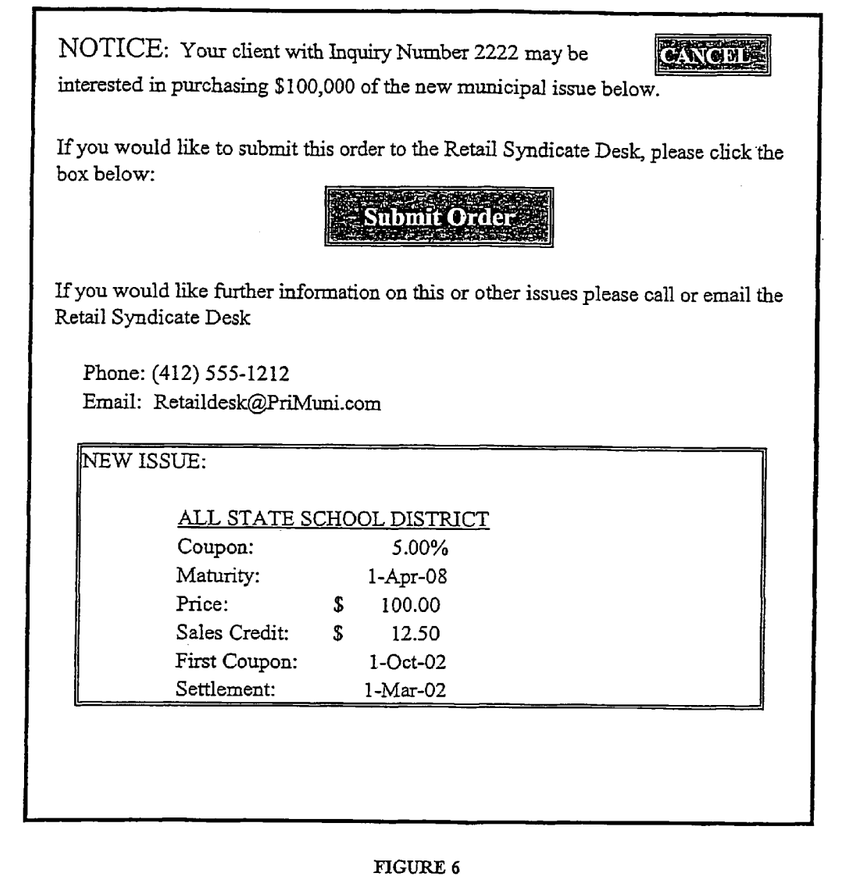
FIG. 6 is a screen print of an example of an electronic order solicitation generated by the method shown in FIG. 3.

After the system compares the inquiry database data with the syndicate inputs data, and identifies all matches between the syndicate inputs and the profiles, the system may generate an electronic notice from the municipal syndicate desk pricing the issue to the broker. An example electronic order solicitation is illustrated in FIG. 6. Based upon this electronic order solicitation, a buyer may complete the order. It is also envisioned that a buyer may directly place an order based upon the matches. The buyer may be a user, a broker, a sales assistant, a customer, a retail salesperson, an institutional salesperson, an investor, a retail investor, an institutional investor, etc.

The present invention is also directed to an apparatus for implementing a communication and order matching method for fixed income securities, including: means for building and maintaining an inquiry database; means for building and maintaining a syndicate inputs database; means for comparing the inquiry database with the syndicate inputs database; and means for identifying matches between the data in the inquiry database and the syndicate inputs database.

In an alternative embodiment, the method may also include a compliance assessment. This may be achieved by the steps of: (a) receiving inputs from at least one broker dealer; (b) comparing the retail inquiry database and syndicate inputs database matches to the broker dealer inputs; and (c) assessing compliance of the order solicitation generations by the results of the comparison. These inputs may contain information as follows in Table 8:

TABLE 8

Broker Dealer Inputs

| Field Number | Fields for Syndicate Manager | Field Type | Character Length |
|---|---|---|---|
| BD1 | Maximum Sales Credit - Serial 01 | Percent | 8 |
| BD2 | Maximum Sales Credit - Serial 02 | Percent | 8 |
| BD3 | Maximum Sales Credit - Serial 03 | Percent | 8 |
| BD4 | Maximum Sales Credit - Serial 04 | Percent | 8 |
| BD5 | Maximum Sales Credit - Serial 05 | Percent | 8 |
| BD6 | Maximum Sales Credit - Serial 06 | Percent | 8 |
| BD7 | Maximum Sales Credit - Serial 07 | Percent | 8 |
| BD8 | Maximum Sales Credit - Serial 08 | Percent | 8 |
| BD9 | Maximum Sales Credit - Serial 09 | Percent | 8 |
| BD10 | Maximum Sales Credit - Serial 10 | Percent | 8 |
| BD14 | Maximum Sales Credit - Serial 14 | Percent | 8 |
| BD15 | Maximum Sales Credit - Serial 15 | Percent | 8 |
| BD16 | Maximum Sales Credit - Serial 16 | Percent | 8 |
| BD17 | Maximum Sales Credit - Serial 17 | Percent | 8 |
| BD18 | Maximum Sales Credit - Serial 18 | Percent | 8 |
| BD19 | Maximum Sales Credit - Serial 19 | Percent | 8 |
| BD20 | Maximum Sales Credit - Serial 20 | Percent | 8 |
| BD21 | Maximum Sales Credit - Term 01 | Percent | 8 |
| BD22 | Maximum Sales Credit - Term 02 | Percent | 8 |
| BD23 | Maximum Sales Credit - Term 03 | Percent | 8 |
| BD24 | Maximum Sales Credit - Term 04 | Percent | 8 |
| BD25 | Maximum Sales Credit - Term 05 | Percent | 8 |
| BD26 | Maximum Sales Credit - Term 06 | Percent | 8 |
| BD27 | Maximum Sales Credit - Term 07 | Percent | 8 |
| BD28 | Maximum Sales Credit - Term 08 | Percent | 8 |
| BD29 | Maximum Sales Credit - Term 09 | Percent | 8 |
| BD30 | Maximum Sales Credit - Term 10 | Percent | 8 |
| BD31 | Suitability Rating | Numeric | 2 |

This is the information to be entered by the brokerage firm. Each firm will have a maximum commission schedule as shown in Fields BD1 through BD30. Field BD31 will be a minimum suitability rating. Any electronic order solicitation that is generated by the system with a lower suitability rating than BD31 must be approved by a manager before going to the broker.

The present invention is a unique process and system that beneficially changes the business practices within the fixed income securities market, specifically, but not exclusively, the municipal bond market. By making the primary market for municipal bonds more efficient, the present invention will increase the underwriter's revenues from the primary market, decrease the issuer's borrowing costs and allow retail investors to earn higher yields.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A system for the distribution of new issue fixed income securities, comprising:
an apparatus is configured to:
transmit a purchase request for at least one new issue fixed income security of an issuer;
set a first offering price for the at least one new issue fixed income security, wherein the first offering price comprises a proceeds amount to be received by the issuer for the at least one new issue fixed income security;
set a second offering price for the at least one new issue fixed income security, wherein the second offering price comprises a proceeds amount to be received by the issuer for the at least one new issue fixed income security, wherein the amount of the second offering price is different than the amount of the first offering price;
initiate at least one first transaction at the first offering price for the at least one new issue fixed income security; and
initiate at least one second transaction at the second offering price for the at least one new issue fixed income security,
wherein at least one of the first offering price and the second offering price of the new issue fixed income security provides an increased yield to at least one investor and a decreased cost to the issuer.

2. The system of claim 1, wherein at least one of the first offering price and the second offering price comprises a commission.

3. The system of claim 1, wherein the apparatus is further configured to transmit a notification to the issuer comprising at least one of the following: the first offering price, the second offering price, a commission, the proceeds amount to be received by the issuer, or any combination thereof.

4. The system of claim 1, wherein at least one of the at least one first transaction and the at least one second transaction occurs between at least one of the following: an underwriter, a brokerage firm, a retail broker, an institutional broker, an investor, a retail investor, an institutional investor, or any combination thereof.

5. The system of claim 1, wherein the at least one new issue fixed income security is at least one of the following: a municipal bond, a corporate bond, or a government agency security, or any combination thereof.

6. The system of claim 1, wherein the first offering price comprises (i) a commission and (ii) a proceeds amount to be received by the issuer for the at least one new issue fixed income security; and wherein the second offering price comprises at least one of the following: (i) a different commission, (ii) a different proceeds amount to be received by the issuer for the at least one new issue fixed income security, or any combination thereof.

* * * * *